United States Patent
Lv et al.

(10) Patent No.: US 11,255,590 B2
(45) Date of Patent: Feb. 22, 2022

(54) REFRIGERATOR

(71) Applicants: HEFEI HUALING CO., LTD., Hefei (CN); HEFEI MIDEA REFRIGERATOR CO., LTD., Hefei (CN); MIDEA GROUP CO., LTD., Foshan (CN)

(72) Inventors: Zhengguang Lv, Hefei (CN); Yang Shao, Hefei (CN); Zengqiang Si, Hefei (CN); Guangqing Yang, Hefei (CN); Jincai Wang, Hefei (CN)

(73) Assignees: HEFEI HUALING CO., LTD., Hefei (CN); HEFEI MIDEA REFRIGERATOR CO., LTD., Hefei (CN); MIDEA GROUP CO., LTD., Foshan (CN)

( * ) Notice: Subject to any disclaimer, the term of this patent is extended or adjusted under 35 U.S.C. 154(b) by 167 days.

(21) Appl. No.: 16/539,955

(22) Filed: Aug. 13, 2019

(65) Prior Publication Data

US 2019/0360737 A1 Nov. 28, 2019

Related U.S. Application Data

(63) Continuation of application No. PCT/CN2017/079055, filed on Mar. 31, 2017.

(30) Foreign Application Priority Data

Feb. 13, 2017 (CN) .......................... 201710076911.6

(51) Int. Cl.
*F25C 1/24* (2018.01)
*F25C 5/20* (2018.01)
*F25D 17/06* (2006.01)
*F25D 23/06* (2006.01)
*F25D 23/12* (2006.01)

(52) U.S. Cl.
CPC ................. *F25C 1/24* (2013.01); *F25C 5/22* (2018.01); *F25D 17/062* (2013.01); *F25D 23/06* (2013.01);
(Continued)

(58) Field of Classification Search
CPC .. F25B 2700/173; F25C 1/24; F25C 2400/10; F25C 2700/04; F25C 5/22; F25D 17/062;
(Continued)

(56) References Cited

U.S. PATENT DOCUMENTS 6,964,177 B2   11/2005   Lee et al.
7,076,967 B2 *  7/2006   Lee .......................... F25C 1/04
                                                        62/353
(Continued)

FOREIGN PATENT DOCUMENTS

CN   101307977 A   11/2008
CN   102393121 A   3/2012
(Continued)

*Primary Examiner* — Filip Zec
(74) *Attorney, Agent, or Firm* — Seed IP Law Group LLP

(57) ABSTRACT

A refrigerator comprising a refrigerator body provided with a refrigerating compartment, an ice maker, an ice-making air duct, a first fan assembly disposed in the ice-making air duct and an ice maker evaporator is disclosed. The ice-making air duct comprises an air inlet duct and an air return duct, which are both disposed in a foaming layer of the refrigerating compartment, and one ends thereof close to the ice maker extend into a foaming layer on a door body of the ice maker. The first fan assembly is detachably disposed in the air return duct, and may be integrally disassembled from and installed in the air return duct. The ice maker evaporator is disposed between the air inlet duct and the air return duct and at the side far away from the ice maker.

19 Claims, 3 Drawing Sheets

(52) U.S. Cl.
CPC ........ *F25D 23/126* (2013.01); *F25C 2400/10* (2013.01); *F25D 2201/10* (2013.01); *F25D 2317/068* (2013.01)

(58) Field of Classification Search
CPC ............... F25D 17/065; F25D 2201/10; F25D 2317/061; F25D 2317/067; F25D 2317/068; F25D 2317/0681; F25D 2317/0682; F25D 23/04; F25D 23/06; F25D 23/126; F25D 2700/121; Y02P 60/85
See application file for complete search history.

(56) References Cited

U.S. PATENT DOCUMENTS

| | | | |
|---|---|---|---|
| 7,591,141 B2* | 9/2009 | Wetekamp | F25D 11/02 |
| | | | 62/187 |
| 8,074,464 B2 | 12/2011 | Venkatakrishnan et al. | |
| 2007/0074527 A1* | 4/2007 | Lee | F25C 5/22 |
| | | | 62/344 |
| 2010/0139304 A1* | 6/2010 | Kim | F25D 17/065 |
| | | | 62/291 |
| 2011/0011106 A1 | 1/2011 | Ahn et al. | |
| 2012/0006047 A2* | 1/2012 | Anselmino | F25C 5/182 |
| | | | 62/344 |
| 2014/0157812 A1 | 6/2014 | Hwang | |
| 2016/0370087 A1 | 12/2016 | Koo | |

FOREIGN PATENT DOCUMENTS

| | | |
|---|---|---|
| CN | 205980533 U | 2/2017 |
| JP | 2010-101517 A | 5/2010 |

* cited by examiner

REFRIGERATOR

CROSS-REFERENCE TO RELATED APPLICATION

This present application is a continuation of and claims priority and benefit to PCT Application No. PCT/CN2017/079055, filed on Mar. 31, 2017, which claims priority and benefit to Chinese patent application No. 201710076911.6 filed on Feb. 13, 2017, entitled "Refrigerator", the entire contents of which are herein incorporated by reference.

BACKGROUND

Technical Field

The present disclosure relates to the field of household appliances technologies, and particularly to a refrigerator, specifically to a refrigerator with simple structure and capable of effectively improving the power efficiency and ice-making property of an ice maker and reducing the probability of failure of an ice-making fan.

Description of the Related Art

Generally, the refrigerator is divided into a refrigerating compartment and a freezing compartment. Recently, in order to facilitate people's use, most of the household refrigerators currently on the market are equipped with an ice maker, wherein the ice maker is disposed inside the refrigerating compartment and has a chamber communicated with a chamber of the refrigerating compartment, and an ice maker fan is also disposed inside the refrigerator so as to improve the circulation efficiency of the cold air.

In general, as indicated in U.S. Pat. No. 6,964,177, the ice maker fan is installed in the chamber of an ice maker evaporator in the refrigerating compartment so as to blow the cold air from the ice maker evaporator to the ice maker on the door, thereby refrigerating the ice maker; or as indicated in U.S. Pat. No. 8,074,464, the ice maker fan is installed inside the chamber of an ice maker on the refrigerator door, and the fan draws air from the chamber on the door to refrigerate the ice maker. Although the circulation efficiency of the cold air can be improved by the installation method above, there are still some problems remaining to be solved, for example, the assembly process is complicated, and the operation is difficult when the fan is in need of maintenance; the ice storage space is occupied and the ice capacity is reduced, if the fan is placed inside the ice-making chamber on the door body; large refrigerating space is occupied by the volume of the ice maker evaporator chamber due to the volume of the fan, if the fan is placed in the chamber of the ice maker evaporator; an effective wind path and flow field cannot be formed in ice-making chamber on the door body by the fan, thereby resulting in low utilization rate while the wind path and flow field formed in the ice maker evaporator are too complicated; when the fan is located in the ice-making chamber on the door body, since humid air is generated as the ice maker performs ice unloading operation by heating, it is easy to come in contact with the ice-making fan and ice and frost are generated on the ice-making fan, thereby resulting in the fault; and when the fan is located in the chamber of the ice maker evaporator, since the ice-making fan is close to the ice maker evaporator, it is easy to come into contact with the water vapor which causes ice blockage, thereby resulting in the fault.

BRIEF SUMMARY

Technical Problems to be Solved

An object of the present disclosure is to provide a refrigerator with simple structure and capable of effectively improving the power efficiency and ice-making property of an ice maker and reducing the probability of failure of an ice-making fan, so as to solve the technical problem that the existing ice maker fan has complex installation mode, ice storage space is occupied and the ice-making fan is prone to generate ice and frost, thereby causing the fault.

Technical Solutions

In order to solve the technical problems above, the present disclosure provides a refrigerator comprising a refrigerator body provided with a refrigerating compartment, further comprising an ice maker, an ice-making air duct, a first fan assembly disposed in the ice-making air duct and an ice maker evaporator; wherein the ice maker is disposed inside the refrigerating compartment; the ice-making air duct comprises an air inlet duct and an air return duct communicating with the ice maker and the refrigerating compartment, both the air inlet duct and the air return duct are disposed in a foaming layer of the refrigerating compartment, and one ends of the air inlet duct and the air return duct close to the ice maker each extend into a foaming layer on a door body of the ice maker; the first fan assembly is detachably disposed in the air return duct located inside the foaming layer of the refrigerating compartment; the ice maker evaporator is disposed between the air inlet duct and the air return duct and at the side far away from the ice maker.

In an embodiment of the present disclosure, the air return duct located inside the foaming layer of the refrigerating compartment comprises a first air return duct and a second air return duct communicated to each other, and the first fan assembly is disposed between the first air return duct and the second air return duct.

In an embodiment of the present disclosure, the first fan assembly comprises an air return housing of which the inside is hollow and both ends having openings and a first fan disposed inside the air return housing, wherein one opening communicates with the first air return duct and the other opening communicates with the second air return duct.

In an embodiment of the present disclosure, a thermal insulation layer is disposed on the outer wall surface of the side of the air return housing close to the refrigerating compartment.

In an embodiment of the present disclosure, a sealing ring is disposed at the joint between the air return housing and the thermal insulation layer so as to achieve the sealed connection between the air return housing and the thermal insulation layer.

In an embodiment of the present disclosure, the refrigerator according to the present disclosure further comprises a second fan disposed at an outlet of the air inlet duct inside the foaming layer on the door body of the ice maker.

In an embodiment of the present disclosure, the refrigerator according to the present disclosure further comprises a controller which is in electrical signal connection with the first fan and the second fan, respectively, so as to control rotational speeds of rotors of the first fan and the second fan.

In an embodiment of the present disclosure, a control mode of the controller comprises:
acquiring a temperature inside the ice maker; and
determining the rotational speeds of rotors of the first fan and the second fan according to the temperature inside the ice maker so as to control the first fan and the second fan.

In an embodiment of the present disclosure, a control mode of the controller comprises:

acquiring an ice-making speed of the ice maker; and determining the rotational speeds of rotors of the first fan and the second fan according to the ice-making speed of the ice maker so as to control the first fan and the second fan.

In an embodiment of the present disclosure, a control mode of the controller comprises:

acquiring an ice-making amount required for the ice maker; and determining the rotational speeds of rotors of the first fan and the second fan according to the ice-making amount required for the ice maker so as to control the first fan and the second fan.

Beneficial Effects

The following advantages are achieved through the technical solution above: the present disclosure provides a refrigerator comprising a refrigerator body provided with a refrigerating compartment, further comprising an ice maker, an ice-making air duct, a first fan assembly disposed in the ice-making air duct and an ice maker evaporator; the ice maker is disposed inside the refrigerating compartment; the ice-making air duct comprises an air inlet duct and an air return duct communicating with the ice maker and the refrigerating compartment, both the air inlet duct and the air return duct are disposed in a foaming layer of the refrigerating compartment, and one ends of the air inlet duct and the air return duct close to the ice maker each extend into a foaming layer on a door body of the ice maker; the first fan assembly is detachably disposed in the air return duct located inside the foaming layer of the refrigerating compartment, such that it can be integrally disassembled from and installed in the air return duct and good installation and maintenance manufacturability of the first fan assembly are achieved; neither the compartment of the ice maker evaporator nor the ice storage space of the ice maker are occupied, thereby being beneficial to improving the ice storage capacity of the ice maker; simple structure and convenient process are achieved; the ice maker evaporator is disposed between the air inlet duct and the air return duct and at the side far away from the ice maker; the first fan assembly is disposed in the air return duct and below the ice maker evaporator such that the air temperature is relatively high and can naturally rise when the first fan blows the air that the ice maker have already used towards the ice maker evaporator, which is beneficial to improve the driving efficiency of the fan and the heat exchange efficiency of the ice maker evaporator, simultaneously avoid both the quality defect caused by freezing of the fan due to the strong cold air and the fault problem caused by allowing the fan to come in contact with the humid air or moisture.

| Description of the reference numbers | |
|---|---|
| 1 refrigerator body | 2 door body |
| 3 refrigerating compartment | 4 ice maker |
| 5 air inlet duct | 6 air return duct |
| 6-1 first air return duct | 6-2 second air return duct |
| 7 ice maker evaporator | 8 air return housing |
| 9 first fan | 10 thermal insulation layer |
| 11 sealing ring | 12 second fan |

DETAILED DESCRIPTION

In order to make the objects, the technical solutions and the advantages of embodiments of the present disclosure more clear, the technical solutions of the embodiments of the present disclosure will be clearly and completely described below in conjunction with the drawings. It is obvious that the described embodiments are a part of and not all of the embodiments of the present disclosure. All other embodiments obtained by a person skill in the art based on the embodiments of the present disclosure fall within the protective scope of the present disclosure.

Figure 1:
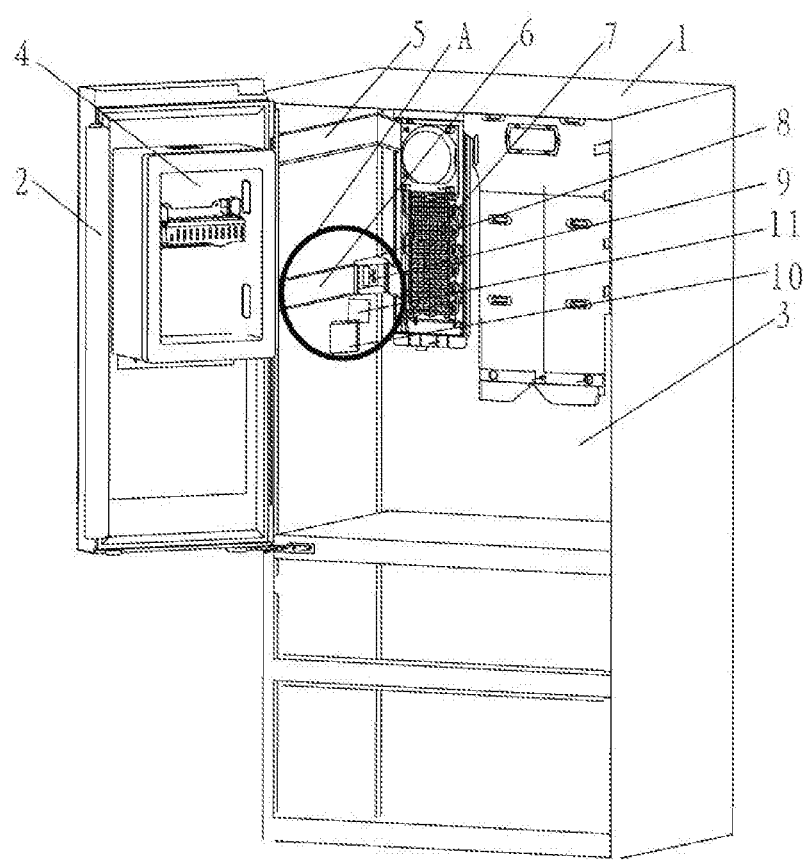
FIG. 1 is a schematic structural view of a refrigerator in which a first fan assembly is mounted on an air return duct according to some embodiments of the present disclosure.
Figure 2:
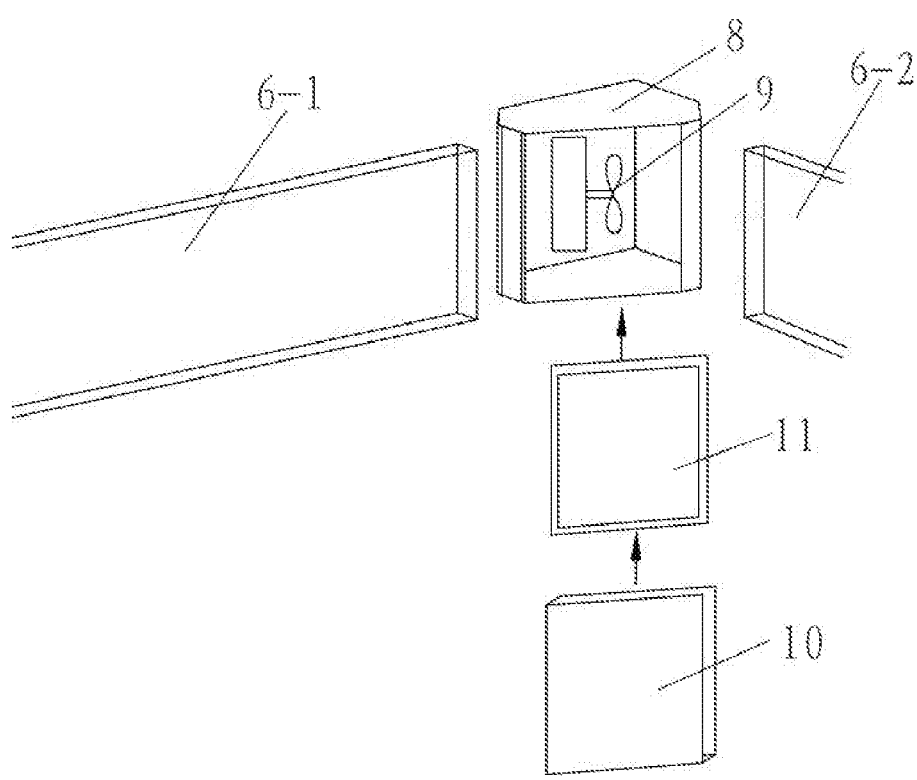
FIG. 2 is a partial enlarged view of area A in FIG. 1.
Figure 3:
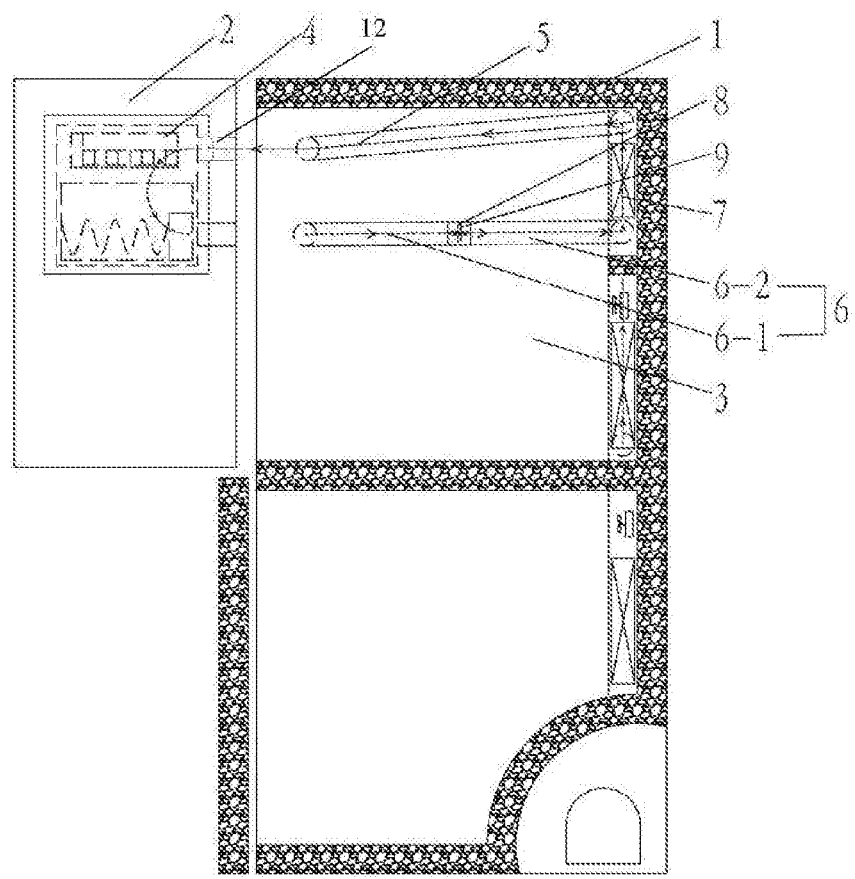
FIG. 3 is a side view of the refrigerator after the refrigerating compartment door panel is opened according to some embodiments of the present disclosure.

As shown in FIGS. 1 to 3, the present disclosure provides a refrigerator comprising a refrigerator body 1 provided with a refrigerating compartment 3, further comprising an ice maker 4, an ice-making air duct, a first fan assembly disposed in the ice-making air duct and an ice maker evaporator 7; the ice maker 4 is disposed inside the refrigerating compartment 3; the ice-making air duct comprises an air inlet duct 5 and an air return duct 6 communicating with the ice maker 4 and the refrigerating compartment 3, wherein the air inlet duct 5 is used for supplying the cooling air from the refrigerating compartment 3 to the ice maker 4, the air return duct 6 is used for returning the cooling air that the ice maker 4 have already used from the ice maker 4 back to the refrigerating compartment 3; the air inlet duct 5 and the air return duct 6 are both disposed in a foaming layer of the refrigerating compartment 3, and one end of each of the air inlet duct 5 and the air return duct 6 close to the ice maker extends into a foaming layer on a door body 2 of the ice maker 4, and thereby, the occupation of the chamber of the ice maker evaporator 7 and the ice storage space of the ice maker 4 is avoided thereby being beneficial to improving the single ice storage capacity of the ice maker 4; the first fan assembly is detachably disposed in the air return duct 6 located inside the foaming layer of the refrigerating compartment 3 such that it can be integrally disassembled from and installed in the air return duct 6 and good installation and maintenance manufacturability of the first fan assembly are achieved; the ice maker evaporator 7 is disposed between the air inlet duct 5 and the air return duct 6 and at the side far away from the ice maker 4, the first fan assembly is disposed in the air return duct 6 and below the ice maker evaporator 7 such that the air temperature is relatively high and can naturally rise when the first fan 9 blows the air that the ice maker 4 has already used towards the ice maker evaporator 7, which is beneficial to improve the driving efficiency of the fan and the heat exchange efficiency of the ice maker evaporator 7, simultaneously avoid both the quality defect caused by freezing of the fan due to the strong cold air and the fault problem caused by allowing the fan to come in contact with the humid air or moisture.

Specifically, the air return duct 6 located inside the foaming layer of the refrigerating compartment 3 comprises a first air return duct 6-1 and a second air return duct 6-2 communicated to each other, and the first fan assembly is disposed between the first air return duct 6-1 and the second air return duct 6-2. Preferably, in the present embodiment, the first fan assembly is disposed at an intermediate position of the air return duct 6 inside the foaming layer of the refrigerating compartment 3, that is, having the identical interval to the chamber of the ice maker 4 with an interval away from the ice maker evaporator 7. By this arrangement, the effect of water vapor generated and possible spilling water by the ice maker 4 during water supply and ice making courses on the first fan 9 can be reduced, and the effect of high and low temperatures, high and low humidity environment generated by the evaporator during defrosting and cooling on the first fan 9 can also be reduced, such that the probability of the failure problem of the first fan 9 caused by the chamber of the ice maker 4 and the ice maker evaporator 7 is minimized so as to maintain the long-term operation of the refrigerator.

In particular, the first fan 9 can be replaced by fans with different air volume according to the size of the selected refrigerator or products with different ice volume requirements, thereby achieving standardized design.

Specifically, the first fan assembly comprises an air return housing 8 of which the inside is hollow and both ends have openings and the first fan 9 disposed inside the air return housing 8. By adopting the first fan assembly with the modular design, it is convenient to mount and disassemble and beneficial to improve the generation efficiency; since the first fan 9 can be fixed in the air return housing 8 by screws or bolts, it is simple in structure and convenient to mount and disassemble; and one opening communicates with the first air return duct 6-1 and the other opening communicates with the second air return duct 6-2. In order to improve the exhausting effect, the end shapes of the two openings of the air return housing 8 match those of the first air return duct 6-1 and the second air return duct 6-2, respectively. The connection between the two openings of the air return housing 8 and respective first air return duct 6-1 and second air return duct 6-2 may be one or more of screw connection, snap connection, and rivet connection, and by this way, it is simple in structure and process and is also beneficial to improve the production efficiency of the refrigerator, and the excellent fixing effect is achieved.

Further, in order to prevent the failure occurrence and quality problem of the fan inside the air return housing 8 due to the strong cold air, a thermal insulation layer 10 is disposed on the outer wall surface of the side of the air return housing 8 close to the refrigerating compartment 3. Specifically, in the present embodiment, the thermal insulation layer 10 is a plate-shaped body made of a thermal insulation material. The plate-shaped body can be fixed to the outer wall surface of the air return housing 8 by one of screw connection, rivet connection or snap connection, such that the difference between the temperature inside the air return housing 8 and the temperature in the refrigerating compartment 3 can be blocked and the side of the first fan 9 close to the refrigerating compartment 3 can be prevented from being condensed so as to maintain the normal operation of the first fan assembly.

In order to further improve the thermal insulation effect of the air return housing 8, a sealing ring 11 is disposed at the joint between the air return housing 8 and the thermal insulation layer 10 so as to achieve the sealed connection between the air return housing 8 and the thermal insulation layer 10. Specifically, in the present embodiment, the thermal insulation layer 10 is a plate-shaped body made of a thermal insulation material and the shape of the sealing ring 11 matches that of the plate-shaped body correspondingly.

Further, the refrigerator according to the present disclosure further comprises a second fan 12 disposed at an outlet of the air inlet duct 5 inside the foaming layer on the door body 2 of the ice maker 4. In the present embodiment, by mounting the second fan 12 at the outlet of the air inlet duct 5 inside the foaming layer on the door body 2 of the ice maker 4, the second fan 12 drives the flowing of the air at the outlet of the inlet duct 5 when the ice maker 4 works, so that the problem of the leakage of the cold air of the air duct due to worse sealing connection can be reduced, which is beneficial to improve the ice-making efficiency of the ice maker 4.

In particular, the second fan 12 can be replaced by fans with different air volume according to the size of the selected refrigerator or products with different ice volume requirements, thereby achieving standardized design.

Further, the refrigerator according to the present disclosure further comprises a controller which is in electrical signal connection with the first fan 9 and the second fan 12, respectively, so as to control rotational speeds of rotors of the first fan 9 and the second fan 12, thereby achieving the high-efficient and energy-saving effects.

In an embodiment of the present disclosure, three control modes of the controller specifically exist as follows.

A first control mode comprises:

acquiring a temperature inside the ice maker 4; and determining the rotational speeds of rotors of the first fan 9 and the second fan 12 according to the temperature inside the ice maker 4 so as to control the first fan and the second fan. Specifically, during operation, the difference between the acquired current temperature inside the ice maker 4 and a preset temperature of the ice maker 4 can be made, and the rotational speeds of rotors of the first fan 9 and the second fan 12 are adjusted accordingly depending on the acquired difference so as to achieve an optimal energy-saving state.

A second control mode of the controller comprises:

acquiring an ice-making speed inside the ice maker 4; and determining the rotational speeds of rotors of the first fan 9 and the second fan 12 according to the ice-making speed inside the ice maker 4 so as to control the first fan and the second fan. Specifically, during operation, the difference between the acquired current ice-making speed of the ice maker 4 and a preset ice-making speed of the ice maker 4 can be made, and the rotational speeds of rotors of the first fan 9 and the second fan 12 are adjusted accordingly depending on the acquired difference so as to achieve an optimal energy-saving state.

A third control mode of the controller comprises:

acquiring an ice-making amount required for the ice maker 4; and determining the rotational speeds of rotors of the first fan 9 and the second fan 12 according to the ice-making amount required for the ice maker so as to control the first fan 9 and the second fan 12. Specifically, during operation, the difference between the acquired current ice-making amount of the ice maker 4 and a preset ice-making amount of the ice maker 4 can be made, and the rotational speeds of rotors of the first fan 9 and the second fan 12 are adjusted accordingly depending on the acquired difference so as to achieve an optimal energy-saving state.

In particular, the control mode of the controller can be adjusted accordingly depending on the actual needs of the user.

To sum up, the present disclosure provides a refrigerator comprising a refrigerator body provided with a refrigerating compartment, further comprising an ice maker, an ice-making air duct, a first fan assembly disposed in the ice-making air duct and an ice maker evaporator; the ice maker is disposed inside the refrigerating compartment; the ice-making air duct comprises an air inlet duct and an air return duct for communicating the ice maker and the refrigerating compartment, both the air inlet duct and the air return duct are disposed in a foaming layer of the refrigerating compartment, and one end of each of the air inlet duct and the air return duct close to the ice maker extends into a foaming layer on a door body of the ice maker; the first fan assembly is detachably disposed in the air return duct located inside the foaming layer of the refrigerating compartment, such that it can be integrally disassembled from and installed in the air return duct and good installation and maintenance manufacturability of the first fan assembly are achieved; neither the compartment of the ice maker evaporator nor the ice storage space of the ice maker are occupied, thereby being beneficial to improving the ice storage capacity of the ice maker, simple structure and convenient process are achieved; the ice maker evaporator is disposed between the air inlet duct and the air return duct and at the side far away from the ice maker; the first fan assembly is disposed in the air return duct and below the ice maker evaporator such that the air temperature is relatively high and can naturally rise when the first fan blows the air that the ice maker have already used towards the ice maker evaporator, which is beneficial to improve the driving efficiency of the fan and the heat exchange efficiency of the ice maker evaporator, simultaneously avoid both the quality defect caused by freezing of the fan due to the strong cold air and the fault problem caused by allowing the fan to come in contact with the humid air or moisture.

Finally, it should be noted that the embodiments above are only used to illustrate the technical solutions of the present disclosure, and are not limited thereto; although the present disclosure has been described in detail with reference to the foregoing embodiments, it should be understood by a person skilled in the art that the modifications can be made to the technical solutions described in the foregoing embodiments or equivalent replacements can be made to a part of the technical features therein. These modifications and equivalent replacements fail to cause the nature of the corresponding technical solutions to depart from the spirit and scope of the technical solutions of the various embodiments of the present disclosure.

The invention claimed is:

1. A refrigerator, comprising:
a refrigerator body having a refrigerating compartment;
an ice maker disposed inside the refrigerating compartment;
an ice-making air duct;
a first fan assembly disposed in the ice-making air duct, the first fan assembly including:
an air return housing; and
a first fan disposed inside the air return housing;
a thermal insulation layer on the air return housing;
a sealing ring is on a joint between the air return housing and the thermal insulation layer to achieve a sealed connection between the air return housing and the thermal insulation layer; and
an ice maker evaporator,
wherein:
the ice-making air duct comprises an air inlet duct and an air return duct each configured to communicate with the ice maker and the refrigerating compartment, the air inlet duct and the air return duct are disposed in a first foaming layer of the refrigerating compartment, and one end of each of the air inlet duct and the air return duct proximal to the ice maker extends into a second foaming layer on a door body of the ice maker,
the first fan assembly is detachably disposed in the air return duct, and
the ice maker evaporator is disposed between the air inlet duct and the air return duct and at a side distal from the ice maker.

2. The refrigerator of claim 1, wherein the air return duct comprises a first air return duct and a second air return duct communicated with the first air return duct, wherein the first fan assembly is disposed between the first air return duct and the second air return duct.

3. The refrigerator of claim 2, wherein the air return housing having a hollow interior and openings on opposite ends of the air return housing, wherein one of the openings communicates with the first air return duct and the other one of the openings communicates with the second air return duct.

4. The refrigerator of claim 3, wherein the thermal insulation layer is disposed on an outer wall surface of a side of the air return housing proximal to the refrigerating compartment.

5. The refrigerator of claim 3, further comprising a second fan disposed at an outlet of the air inlet duct.

6. The refrigerator of claim 5, further comprising a controller in electrical signal connection with the first fan and the second fan, the controller configured to control rotational speeds of rotors of the first fan and the second fan.

7. The refrigerator of claim 6, wherein a control mode of the controller is configured to:
acquire a temperature inside the ice maker; and
determine the rotational speeds of the rotors of the first fan and the second fan according to the temperature inside the ice maker to control the first fan and the second fan.

8. The refrigerator of claim 6, wherein a control mode of the controller is configured to:
acquire an ice-making speed inside the ice maker; and
determine the rotational speeds of the rotors of the first fan and the second fan according to the ice-making speed inside the ice maker to control the first fan and the second fan.

9. The refrigerator of claim 6, wherein a control mode of the controller is configured to:
acquire an ice-making amount required for the ice maker; and
determine the rotational speeds of the rotors of the first fan and the second fan according to the ice-making amount required for the ice maker to control the first fan and the second fan.

10. A refrigerator, comprising:
a refrigerating compartment;
an ice maker disposed inside the refrigerating compartment;
an air inlet duct configured to supply a cooling air from the refrigerating compartment to the ice maker; and
an air return duct configured to return the cooling air from the ice maker to the refrigerating compartment, the air return duct comprises:
a first air return duct having a first end;
a second air return duct having a second end; and
a first fan assembly coupling the first end of the first air return duct to the second end of the second air return duct;
wherein the air inlet duct, the first air return duct, the second air return duct, and the first fan assembly are disposed in a first foaming layer of the refrigerating compartment, each of the air inlet duct and the air return duct has a respective end extending into a second foaming layer of the ice maker.

11. The refrigerator of claim 10, wherein the first fan assembly comprises a hollow air return housing with a plurality of openings, wherein a first opening of the plurality of openings is configured to couple to the first air return duct and a second opening of the plurality of openings is configured to couple to the second air return duct.

12. The refrigerator of claim 11, wherein the air return housing is coupled to each of the first air return duct and the second air return duct using a screw connection, a snap connection, or a rivet connection.

13. The refrigerator of claim 11, wherein the first fan assembly further comprises a fan inside the air return housing, the fan being fixed in the air return housing using one or more screws or bolts.

14. The refrigerator of claim 11, wherein the first fan assembly further comprises a thermal insulator layer disposed on a surface of the air return housing proximal to the refrigerating compartment.

15. The refrigerator of claim 14, wherein the thermal insulator layer is fixed to the air return housing using a screw connection, a rivet connection, or a snap connection.

16. The refrigerator of claim 10, further comprising an ice maker evaporator disposed between the air inlet duct and the air return duct and at a side distal from the ice maker, wherein the first fan assembly is disposed below the ice maker evaporator.

17. The refrigerator of claim 16, wherein a distance from the first fan assembly to the ice maker is the same as a distance from the first fan assembly to the ice maker evaporator.

18. The refrigerator of claim 10, wherein:
the first air return duct is on at a first sidewall of the refrigerating compartment;
the second air return duct is on a second sidewall of the refrigerating compartment transverse to the first sidewall; and
the first fan assembly is at a corner of the refrigerating compartment at which the first sidewall and the second sidewall terminate.

19. The refrigerator of claim 1, wherein:
the air return duct includes:
a first air return duct on at a first sidewall of the refrigerating compartment; and
a second air return duct on a second sidewall of the refrigerating compartment transverse to the first sidewall;
the first fan assembly is at a corner of the refrigerating compartment at which the first sidewall and the second sidewall terminate.

\* \* \* \* \*